3,341,537
1-TERTIARYAMINOALKOXYPHENYL - 1,2 - DI-
MONOCARBOCYCLIC ARYL - ALKANES AND
THEIR PHARMACEUTICALLY - ACCEPTABLE
ACID-ADDITION SALTS
Dora Nellie Richardson, Macclesfield, England, assignor to Imperial Chemical Industries Limited, London, England, a corporation of Great Britain
No Drawing. Filed Aug. 18, 1964, Ser. No. 390,449
Claims priority, application Great Britain, Sept. 2, 1963, 34,608/63
7 Claims. (Cl. 260—247.2)

This invention relates to triarylalkane derivatives which have useful therapeutic properties.

According to the invention we provide triarylalkane derivatives of the formula:

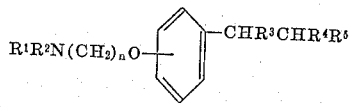

wherein the $R^1R^2N(CH_2)_nO-$ group is in the m- or p-position relative to the $-CHR^3.CHR^4R^5$ group, wherein $R^1$ and $R^2$, which may be the same or different, stand for lower alkyl radicals, or wherein the $-NR^1R^2$ group stands for a nitrogen-containing heterocyclic radical, $n$ stands for an integer from 2 to 6, $R^3$ and $R^2$, which may be the same or different, stand for aryl radicals, optionally substituted by one or more alkyl, alkoxy and/or dialkylaminoalkoxy radicals and/or one or more halogen atoms, and $R^5$ stands for an alkyl or aralkyl radical, and the pharmaceutically-acceptable salts thereof.

It is to be understood that the above definition encompasses all the possible stereoisomeric forms of the triarylalkane derivatives of the invention.

As suitable values for $R^1$ and/or $R^2$ when they stand for lower alkyl radicals there may be mentioned, for example, alkyl radicals of not more than 6 carbon atoms, for example the methyl or ethyl radical, and as suitable values for the $-NR^1R^2$ group when it stands for a nitrogen-containing heterocyclic radical there may be mentioned, for example, a nitrogen-containing heterocyclic radical of not more than 6 ring atoms, for example the N-piperidino, N-morpholino or N-pyrrolidino radical.

As a suitable value for $R^3$ or $R^4$ there may be mentioned, for example, the phenyl radical, optionally substituted by one or more alkyl and/or alkoxy radicals of not more than 6 carbon atoms, for example methyl, ethyl or methoxy radicals, and/or by one or more dialkylaminoalkoxy radicals of not more than 15 carbon atoms, for example a β-diethylaminoethoxy radical, and/or by one or more halogen atoms, for example chlorine or bromine atoms.

As a suitable value for $R^5$ there may be mentioned, for example, an alkyl or aralkyl radical of not more than 12 carbon atoms, for example the methyl, ethyl, n-propyl, isopropyl, n-butyl or benzyl radical. Preferred values of $n$ are 2 and 3.

The preferred triarylalkane derivative of the invention is 1-(p-β-diethylaminoethoxyphenyl)-1-p-methoxyphenyl-2-phenyl-n-pentane and the salts thereof.

As suitable salts of the triarylalkane derivatives of the invention there may be mentioned, for example, acid-addition salts, for example salts with inorganic acids, for example, hydrochloric, sulphuric or phosphoric acid, or salts with organic acids, for example acetic, tartaric or citric acid.

According to a further feature of the invention we provide a process for the manufacture of the triarylalkane derivatives of the invention which comprises the reduction of a triarylalkene derivative of the formula:

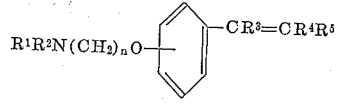

wherein the $R^1R^2N(CH_2)_nO-$ group is in the m- or p-position relative to the $-CR^3=CR^4R^5$ group and wherein $R^1$, $R^2$, $R^3$, $R^4$, $R^5$ and $n$ have the meanings stated above, or a salt thereof.

It is to be understood that the above definition encompasses both geometric isomers of the triarylalkene derivatives, and mixtures of the said geometric isomers. For convenience in the isolation of pure products it is preferred to carry out the said reduction using, as starting material, a single geometric isomer of the appropriate triarylalkene.

The said reduction may be effected, for example, by catalytic hydrogenation, for example by catalytic hydrogenation using a platinum, or palladium-on-carbon catalyst. The catalytic hydrogenation may be carried out at atmospheric pressure or at elevated pressure, and it may be carried out at ambient temperature or at an elevated temperature. The catalytic hydrogenation is conveniently carried out in the presence of a diluent or solvent, for example ethanol or acetone.

The triarylalkene derivatives used as starting materials in the above process may be obtained as described in our co-pending U.K. application No. 34,989/62. For example, the triarylalkene derivatives may be obtained by a process which comprises the dehydration of a triarylalkanol derivative of the formula:

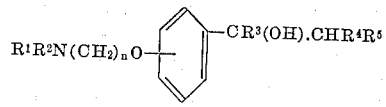

wherein the $R^1R^2N(CH_2)_nO-$ group is in the m- or p-position relative to the $-CR^3(OH).CHR^4R^5$ group, and wherein $R^1$, $R^2$, $R^3$, $R^4$, $R^5$ and $n$ have the meanings stated above, or a salt thereof.

The dehydration may be effected by interaction of the said triarylalkanol derivative with an acid catalyst, for example with an inorganic acid, for example hydrochloric acid, hydrobromic acid or phosphoric acid, or with an organic acid, for example, with formic acid. The interaction may be carried out in an inert diluent or solvent, for example ethanol, and it may be accelerated or completed by the application of heat.

The triarylalkanol derivatives themselves may be obtained by the interaction of a Grignard reagent of the formula:

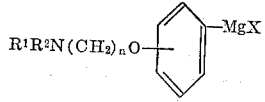

wherein the $R^1R^2N(CH_2)_nO-$ group is in the m- or p-position relative to the $-MgX$ group, wherein $R^1$, $R^2$ and $n$ have the meanings stated above, and wherein X stands for a halogen atom, for example the bromine atom, and a carbonyl compound of the formula $R^3.CO.CHR^4R^5$, wherein $R^3$, $R^4$ and $R^5$ have the meanings stated above. The interaction involving a Grignard reagent may be carried out in an inert diluent or solvent, for example tetrahydrofuran, and it may be accelerated or completed by the application of heat. The Grignard reagents themselves may be obtained from the corresponding halogeno derivatives by conventional procedures.

The triarylalkene derivatives may also, for example, be obtained by a process which comprises the interaction of an aminoalkyl halide derivative of the formula $$R^1R^2N(CH_2)_nX$$

wherein $R^1$, $R^2$, X and $n$ have the meanings stated above, with an alkali metal salt, for example the sodium or potassium salt, of a phenol derivative of the formula:

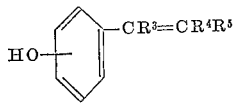

wherein the HO— group is in the m- or p- position relative to the —$CR^3$=$CR^4R^5$ group, and wherein $R^3$, $R^4$ and $R^5$ have the meanings stated above.

The said phenol derivative may be obtained by demethylation of the corresponding methoxy derivative by interaction thereof with pyridine hydrochloride under reflux. The said methoxy derivative may be obtained by dehydration of the corresponding alcohol by interaction thereof with an inorganic acid, for example hydrochloric acid, in ethanol under reflux. The said alcohol may be obtained by the interaction of the corresponding Grignard reagent with the corresponding ketone.

According to a further feature of the invention we provide a process for the manufacture of the triarylalkane derivatives of the invention which comprises the interaction of an aminoalkyl halide derivative of the formula $R^1R^2N(CH_2)_nX$, wherein $R^1$, $R^2$, X and $n$ have the meanings stated above, and a phenol derivative of the formula:

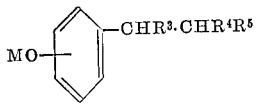

wherein the MO— group is in the m- or the p- position relative to the —$CHR^3 \cdot CHR^4R^5$ group, wherein M stands for an alkali metal atom, for example the sodium or potassium atom, and wherein $R^3$, $R^4$ and $R^5$ have the meanings stated above.

The interaction involving an aminoalkyl halide derivative may be carried out in a diluent or solvent and it may be accelerated or completed by the application of heat.

The phenol derivative used as starting material in the above process may be obtained by demethylation of the coresponding methoxy compound of the formula:

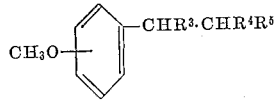

wherein the $CH_3O$— groups is in the m- or p- position relative to the —$CHR^3 \cdot CHR^4R^5$ group, and wherein $R^3$, $R^4$ and $R^5$ have the meanings stated above.

The methoxy compound itself may be obtained, for example, by catalytic hydrogenzation of the corresponding triarylalkane derivative of the formula:

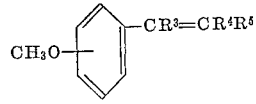

wherein $R^3$, $R^4$ and $R^5$ have the meanings stated above.

The triarylalkane derivatives of the invention are useful for the modification of the endocrine status in man and in anaimals, and they may be used for the management of the sexual cycle and aberrations thereof.

According to a further feature of the invention therefore, we provide pharmaceutical and veterinary compositions which comprise as active ingredient at least one of the triarylalkane derivatives of the invention or a salt thereof in admixture with a pharmaceutically-acceptable diluent or carrier therefor.

The pharmaceutical compositions may be in a form suitable for oral or parenteral use. Oral compositions may be, for example, in the form of tablets, capsules, solutions or suspensions in aqueous media or in non-toxic organic media, dispersible powders suitable for the preparation of liquid suspensions, mixtures with animal foodstuffs or premixes suitable for addition to animal foodstuffs. The premixes preferably contain between 1% and 10% by weight of active ingredient, and the mixtures with animal foodstuffs preferably contain between 0.001% and 0.1% by weight of active ingredient. Compositions suitable for parenteral use may be, for example, in the form of sterile solutions or suspensions in aqueous media or in non-toxic organic media, or sterile dispersible powders suitable for the preparation of sterile liquid suspensions.

The pharmaceutical and veterinary compositions may contain excipients known to the art to be useful in the preparation of such compositions, for example wetting, dispersing, suspending, lubricating, sweetening, flavouring or colouring agents.

The oral compositions may be in the form of tablets wherein the inert diluent or carrier is, for example, maize starch, lactose or alginic acid. There may also be present wetting agents, for example the alkali metal salts of sulphonated dialkylnaphthalenes, for example the sodium salt of sulphonated diisopropylnaphthalene, and lubricating agents for example magnesium stearate. The tablets may contain between about 1 mg. and about 500 mg. of active ingredient.

The invention is illustrated but not limited by the following examples in which the parts are by weight:

*Example 1*

A mixture of 5.5 parts of 1-(p-β-diethylaminoethoxyphenyl)-1-p-methoxyphenyl-2-phenylprop-1-ene, 50 parts of methanol and 0.1 part of a 5% palladium-on-charcoal catalyst is shaken in an atmosphere of hydrogen at a pressure of 110 atmospheres and at a temperature of 50° C. for 15 hours. The mixture is then filtered and the filtrate is evaporated. 4.4 parts of the residue thus obtained is dissolved in a solution of 4.4 parts of citric acid in 25 parts of acetone, and 25 parts of ether are added to the resulting solution. The precipitated solid is collected by filtration and is crystallised from ethyl acetate. There is thus obtained 1-(p-β-diethylaminoethoxyphenyl) - 1 - p-methoxyphenyl - 2 - phenylpropane citrate, M.P. 102–104° C.

The 1-(p-β-diethylaminoethoxyphenyl)-1 - p - methoxyphenyl-2-phenylprop-1-ene used as starting material may be obtained as follows:

6.85 parts of 1-(p-β-diethylaminoethoxyphenyl)-1-p-methoxyphenyl-2-phenyl-n-propanol are dissolved in 50 parts of ethanol, and the solution is acidified by the addition of concentrated hydrochloric acid. The solution is heated at 100° C. under reflux for 3 hours, and then evaporated to dryness under reduced pressure. The residue is dissolved in water and the solution is made alkaline by the addition of a concentrated aqueous solution of sodium hydroxide. The mixture thus obtained is extracted with 100 parts of ether and the ethereal extract is dried and then evaporated. The residue thus obtained is dissolved in the minimum quantity of acetone, a saturated solution of 6 parts of citric acid in acetone is added, and the mixture is filtered. The solid residue thus obtained is crystalised from acetone, and there is thus obtained 1-(p-β-diethylaminoethoxyphenyl)-1-p-methoxyphenyl-2 - phenylprop-1-ene citrate, M.P. 102–104° C., 1-(p-β-diethylaminoethoxyphenyl)-1-p-methoxyphenyl - 2 - phenylprop-1-ene may be obtained from the citrate by conventional procedures.

The 1 - (p - β - diethylaminoethoxyphenyl)-1-p-methoxyphenyl-2-phenyl-n-propanol may be obtained as follows:

To the solution of the Grignard reagent prepared in a conventional manner from 1.95 parts of magnesium and 22.5 parts of p-β-diethylaminoethoxybromobenzene in 40 parts of tetrahydrofuran there is added, at 20–25° C., a solution of 10 parts of p-methoxyphenyl α-methylbenzyl ketone in 35 parts of tetrahydrofuran. The mixture is heated under reflux for 3 hours and is then cooled to ambient temperature. A solution of 100 parts of ammonium chloride in 250 parts of water is added and the mixture is shaken and then filtered, both the solid residue and the filtrate being retained. The solid residue is extracted twice with 100 parts of ether. The filtrate is separated, the aqueous and organic phases both being retained. The aqueous phase is extracted with the ethereal solution which was previously used for extracting the solid residue, and the ethereal extract thus obtained and the above mentioned organic phase are then combined. The ethereal solution thus obtained is dried over sodium sulphate and evaporated to dryness. The residual oil is shaken with 200 parts of 5% v./v. aqueous acetic acid and the mixture is then filtered. The filtrate is made alkaline with sodium hydroxide solution and the alkaline mixture is extracted with 100 parts of ether. The ethereal extract is dried and evaporated to dryness and there is thus obtained as a residue 1-(p-β-diethylaminoethoxyphenyl)-1-p-methoxyphenyl-2-phenyl-n-propanol.

Example 2

A mixture of 2.2 parts of 1-(p-β-diethylaminoethoxyphenyl)-1-p-methoxyphenyl-2-phenyl-2-propylethylene, 5 parts of a 5% palladium-on-charcoal catalyst and 75 parts of acetone is shaken in an atmosphere of hydrogen at a pressure of 100 atmospheres and at a temperature of 50° C. for 15 hours. The reaction mixture is then filtered and the filtrate is evaporated to dryness under reduced pressure. 1.4 parts of the oily residue thus obtained are mixed with a solution of 1.4 parts of citric acid in 5 parts of acetone. Ether is then added to the solution thus obtained until the precipitation of solid is complete and the mixture is then filtered. The solid residue is crystallised from a mixture of acetone and ether and there is thus obtained 1-(p-β-diethylaminoethoxyphenyl)-1-p-methoxyphenyl-2-phenyl-n-pentane citrate, M.P. 117–118° C.

Example 3

A mixture of 6.0 parts of 1-(p-diethylaminoethoxyphenyl)-1,2-diphenyl-2-isopropylethylene, 5.0 parts of a 5% palladium-on-charcoal catalyst and 75 parts of acetone is shaken together in an atmosphere of hydrogen at 100 atmospheres and at a temperature of 50° C. for 15 hours. The reaction mixture is then filtered and the filtrate is evaporated to dryness under reduced pressure, 3.6 parts of the residual oil thus obtained were mixed with 3.6 parts of citric acid dissolved in 10 parts of acetone. Ether is then added to the solution thus obtained until the precipitation of solid is complete and the mixture is then filtered. The solid residue is crystallised from acetone and there is thus obtained 1-(p-β-diethylaminoethoxyphenyl)-1,2-diphenyl-3-methylbutane citrate, M.P. 134–136° C.

In a similar manner, using 1-(p-β-dimethylaminoethoxyphenyl)-1,2-trans-diphenylbut-1-ene, M.P. 97–98° C. as starting material in the above process, there is obtained 1-(p-β-dimethylaminoethoxyphenyl)-1,2-diphenylbutane citrate, M.P. 146–148° C.

Example 4

A mixture of 6.5 parts of 1-(p-β-dimethylaminoethoxyphenyl)-1,2-cis-diphenylbut-1-ene, M.P. 74–76° C., 2 parts of a 5% palladium-on-charcoal catalyst and 75 parts of acetone is shaken in an atmosphere of hydrogen at 100 atmospheres pressure and at 50° C. for 12 hours. The reaction mixture is filtered and the filtrate is evaporated to dryness under reduced pressure. The oily residue is triturated with petroleum ether (B.P. 40–60° C.) and the mixture is then filtered. The solid residue is crystallised from petroleum ether (B.P. 40–60° C.). There is thus obtained 1-(p-β-dimethylaminoethoxyphenyl)-1,2-diphenylbutane, M.P. 99–101° C.

In a similar manner, using 1-(p-β-morpholinoethoxyphenyl)-1,2-trans-diphenylbut-1-ene, M.P. 130–132° C., as starting material in the above process, there is thus obtained 1-(p-β-morpholinoethoxyphenyl)-1,2-diphenylbutane, M.P. 94–96° C.

1-(p-β-morpholinoethoxyphenyl)-1,2-trans-diphenylbut-1-ene may be obtained as follows:

24 parts of 4-hydroxy-α-ethyldesoxybenzoin are dissolved in a solution of 2.3 parts of sodium in 70 parts of methanol and the solution is evaporated to dryness. A mixture of the sodium salt thus obtained, 30 parts of morpholinoethyl chloride and 150 parts of benzene is stirred and heated under reflux for 16 hours. The mixture is filtered, and the filtrate is evaporated. The residue thus obtained is dissolved in 100 parts of 2 N hydrochloric acid and the solution is mixed with activated carbon and is then filtered. The filtrate is made alkaline by the addition of 10 N sodium hydroxide solution and is then extracted with 150 parts of ether in 3 equal portions. The combined extracts are dried over sodium sulphate and are then distilled and there is thus obtained 4-(β-morpholinoethoxy)-α-ethyldesoxybenzoin (B.P. 200–202° C. at 0.125 mm.).

To a solution of the Grignard reagent prepared from 21 parts of bromobenzene and 3.1 parts of magnesium in 150 parts of ether, there is added a solution of 41.8 parts of 4-(β-morpholinoethoxy)-α-ethyldesoxybenzoin in 150 parts of ether. The mixture thus obtained is heated under reflux for 3 hours, and is then cooled and mixed with a solution of 300 parts of ammonium chloride in 750 parts of water. The mixture is filtered, the solid residue thus obtained is retained and the ethereal filtrate is dried with sodium sulphate and is then evaporated. The residue thus obtained and the solid residue which has been retained are combined and are crystallised from ethanol. There is thus obtained 1-(p-β-morpholinoethoxyphenyl)-1,2-diphenylbutan-1-ol, M.P. 156–158° C. A mixture of 10 parts of 1-(p-β-morpholinoethoxyphenyl)-1,2-diphenylbutan-1-ol, 100 parts of ethanol and 5 parts of concentrated hydrochloric acid are heated under reflux for 3 hours, and the reaction mixture is then evaporated to dryness. The residue is dissolved in water and the solution is made alkaline with 10 N aqueous sodium hydroxide and is extracted with 100 parts of chloroform in two equal portions. The chloroform extract is dried over sodium sulphate and is then evaporated. The residue is crystallised from petroleum ether (B.P. 100–120° C.) and then from methanol. There is thus obtained 1-(p-β-morpholinoethoxyphenyl)-1,2-trans-diphenylbut-1-ene, M.P. 130–132° C. From the petroleum mother liquor the cis isomer, M.P. 128–130° C., may be obtained by evaporation and further crystallisation from methanol.

Example 5

A solution of 4.5 parts of β-morpholinoethylchloride in 100 parts of benzene is added to a solution of 4.53 parts of 1-(p-hydroxyphenyl)-1,2-diphenylbutane M.P. 118–120° C. in 50 parts of methanol containing 0.345 part of sodium. The reaction mixture is stirred and heated under reflux for 15 hours. The mixture is then cooled and filtered and the filtrate is evaporated to dryness under reduced pressure. The residue is triturated with petroleum ether (B.P. 40–60° C.) and the mixture is then filtered. The solid residue is crystallised from petroleum ether (B.P. 60–80° C.) and there is thus obtained 1-(p-β-morpholinoethoxyphenyl)-1,2-diphenylbutane, M.P. 94–96° C.

1-(p-hydroxyphenyl)-1,2-diphenylbutane, used as starting material in the above process, may be obtained as follows:

A mixture of 13.4 parts of 1-(p-methoxyphenyl)-1,2-diphenylbutane of M.P. 74–76° C. and 39 parts of pyridine hydrochloride is heated under reflux for 30 minutes. The reaction mixture is poured onto ice and the precipitate is extracted with 150 parts of ether in three equal portions. The ethereal extract is washed with water and is then dried over sodium sulphate and evaporated to dryness. The solid residue is crystallised from petroleum ether (B.P. 60–80° C.) and there is thus obtained 1-(p-hydroxyphenyl)-1,2-diphenylbutane, M.P. 118–120° C. The 1-(4-methoxyphenyl)-1,2-diphenylbutane is prepared by agitating a mixture of 58 parts of 1-(p-methoxyphenyl)-1,2-trans-diphenylbut-1-ene, M.P. 120–122° C., 7 parts of a 5% palladium-on-charcoal catalyst and 500 parts of ethanol in an atmosphere of hydrogen at 100 atmospheres pressure and at a temperature of 50° C. for 12 hours. The mixture is filtered, the solid residue is washed with 100 parts of ethanol, and the combined filtrate and washings are evaporated until the residual solution crystallises. The mixture is filtered, and there is thus obtained 1-(p-methoxyphenyl)-1,2-diphenylbutane, M.P. 74–76° C. (B.P. 154–159° C. at 0.08 mm.).

Example 6

2 parts of γ-dimethylaminopropyl chloride dissolved in 100 parts of benzene are added to 5.3 parts of the sodium salt of the isomer of 1-(p-hydroxyphenyl)-1,2-diphenylbutane of M.P. 118–120° C. and the mixture is stirred and heated under reflux for 8 hours. The reaction mixture is then cooled and filtered, and the solid residue is washed with 20 parts of benzene. The combined filtrate and washings are evaporated and the residue is dissolved in 300 parts of ether. The ethereal solution is extracted with 200 parts of N-hydrochloric acid, and the acidic extract is made alkaline with ammonium hydroxide. The alkaline mixture is extracted with 300 parts of ether in three equal portions. The ethereal extract is dried over sodium sulphate and is then evaporated. There is thus obtained 1-(p-γ-dimethylaminopropoxyphenyl)-1,2-diphenylbutane, M.P. 67–70° C.

In a similar manner, using β-diethylaminoethyl chloride as starting material in the above process there is thus obtained 1-(p-β-diethylaminoethoxyphenyl)-1,2-diphenylbutane as an oil which gives a citrate of M.P. 147–149° C. by interaction with an equal weight of citric acid dissolved in acetone.

Example 7

3.9 parts of 1-(p-hydroxyphenyl)-1,2-diphenylbutane, M.P. 65–78° C. are dissolved in a solution of 0.3 part of sodium in 50 parts of ethanol, and the solution thus obtained is evaporated to dryness. The residual solid is mixed with a solution of 1.6 parts of γ-dimethylaminopropyl chloride in 50 parts of benzene, and the resulting mixture is stirred and heated under reflux for 8 hours. The reaction mixture is cooled and filtered and the residual solid is washed with benzene. The combined filtrate and washings are evaporated and to the residual oil there is added an equal weight of citric acid dissolved in acetone. There is thus obtained 1-(p-γ-dimethylaminopropoxyphenyl)-1,2-diphenylbutane citrate, M.P. 100–102° C.

The 1-(p-hydroxyphenyl)-1,2-diphenylbutane used as starting material in the above process may be obtained as follows:

5.6 parts of 1-(p-methoxyphenyl)-1,2-diphenylbutane (B.P. 177–182° C. at 0.18 mm.) and 15 parts of pyridine hydrochloride are heated together under reflux for 1 hour. The reaction mixture is cooled and is stirred with 30 parts of water. The aqueous solution is decanted and the residue is dissolved in 250 parts of ether. The ethereal solution is washed twice with 50 parts of dilute hydrochloric acid in two equal portions and is then dried over sodium sulphate. The ethereal solution is evaporated and there is thus obtained 1-(p-hydroxyphenyl)-1,2-diphenylbutane, M.P. 65–78° C.

1-(p-methoxyphenyl)-1,2-diphenylbutane may be obtained by shaking a mixture of 7.6 parts of 1-(p-methoxyphenyl)-1,2-cis-diphenylbut-1-ene, M.P. 101–103° C., 2 parts of a 5% palladium-on-charcoal catalyst and 100 parts of ethanol in an atmosphere of hydrogen at a pressure of 100 atmospheres and at a temperature of 50° C. for 12 hours. The mixture is filtered and the filtrate is evaporated. There is thus obtained 1-(p-methoxyphenyl)-1,2-diphenylbutane (B.P. 177–182° C. at 0.18 mm.).

1-(p-methoxyphenyl)-1,2-cis-diphenylbut-1-ene, M.P. 101–103° C., is obtained by repeated crystallisation from light petroleum of the isomer of M.P. 88–89° C. described by Dodds et al. (Proc. Roy. Soc., 132B, 83).

Example 8

50 parts of 1-(p-β-dimethylaminoethoxyphenyl)-1-p-methoxyphenyl-2-phenyl-n-pentane citrate, 42 parts of maize starch and 7 parts of alginic acid are intimately mixed and granulated using 10% maize starch paste as the granulating agent. The granules are dried at a temperature not exceeding 50° C., then mixed with 1 part of magnesium stearate and compressed into tablets each weighing 50 mg. There are thus obtained tablets suitable for oral administration for therapeutic purposes.

What I claim is:

1. 1-(p-β-diethylaminoethoxyphenyl) - 1 - p - methoxyphenyl-2-phenyl-n-pentane or the pharmaceutically-acceptable salts thereof.

2. An amino compound as claimed in claim 3 wherein the acid-addition salt is one of an acid selected from the group consisting of hydrochloric, sulphuric, phosphoric, acetic, tartaric and citric acids.

3. An amino compound selected from the compounds of the formulae:

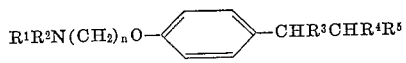

and

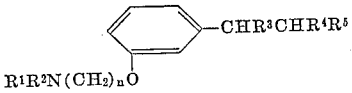

wherein $R^1$ and $R^2$ are selected from methyl and ethyl or the —$NR^1R^2$ group is selected from piperidino, morpholino and pyrrolidino, $n$ is selected from 2 and 3; $R^3$ and $R^4$ are selected from phenyl, and phenyl substituted with a member selected from the group consisting of methyl, ethyl, methoxy, chlorine, bromine and diethylaminoethoxy; and $R^5$ is selected from methyl, ethyl, n-propyl, isopropyl, n-butyl and benzyl, and the pharmaceutically-acceptable acid-addition salts thereof.

4. 1-(p-β-diethylaminoethoxyphenyl)-1 - p - methoxyphenyl-2-phenylpropane or the pharmaceutically-acceptable salts thereof.

5. 1-(p-β-diethylaminoethoxyphenyl)-1,2 - diphenyl - 3-methylbutane or the pharmaceutically-acceptable salts thereof.

6. 1-(p-β-morpholinoethoxyphenyl) - 1,2 - diphenylbutane or the pharmaceutically-acceptable salts thereof.

7. 1-(p-β-dimethylaminoethoxyphenyl)-1,2 - diphenylbutane or the pharmaceutically-acceptable salts thereof.

No references cited.

ALEX MAZEL, *Primary Examiner.*

NICHOLAS S. RIZZO, *Examiner.*

J. TOVAR, *Assistant Examiner.*